US008746581B2

(12) United States Patent
Slavin et al.

(10) Patent No.: US 8,746,581 B2
(45) Date of Patent: Jun. 10, 2014

(54) TECHNIQUES FOR PROVIDING AN ELECTRONIC REPRESENTATION OF A CARD

(75) Inventors: Dan Slavin, Belmont, MA (US); Pero Smrzlic, Leesburg, VA (US)

(73) Assignee: Codebroker, LLC, Belmont, MA (US)

( * ) Notice: Subject to any disclaimer, the term of this patent is extended or adjusted under 35 U.S.C. 154(b) by 184 days.

(21) Appl. No.: 12/371,130

(22) Filed: Feb. 13, 2009

(65) Prior Publication Data
US 2009/0156180 A1   Jun. 18, 2009

Related U.S. Application Data

(63) Continuation-in-part of application No. 11/765,096, filed on Jun. 19, 2007, now Pat. No. 8,430,300, and a continuation-in-part of application No. 12/296,329, filed on Oct. 7, 2008.

(60) Provisional application No. 61/028,669, filed on Feb. 14, 2008.

(51) Int. Cl.
*G06K 19/06* (2006.01)
(52) U.S. Cl.
USPC .......................... 235/494; 235/379; 235/375
(58) Field of Classification Search
CPC .. G06K 19/06037; G06K 7/14; G06F 3/0317; G06F 3/03545; G06Q 20/3274; G06Q 30/02
USPC .................. 235/449, 379, 494; 455/558, 564
See application file for complete search history.

(56) References Cited

U.S. PATENT DOCUMENTS

| | | | | |
|---|---|---|---|---|
| 7,059,520 | B1 * | 6/2006 | Shtesl | 235/449 |
| 7,603,320 | B1 * | 10/2009 | Shu | 705/64 |
| 7,946,477 | B1 * | 5/2011 | Ramachandran et al. | 235/379 |
| 2002/0060246 | A1 * | 5/2002 | Gobburu et al. | 235/462.46 |
| 2002/0123359 | A1 * | 9/2002 | Wei et al. | 455/466 |
| 2004/0019792 | A1 | 1/2004 | Funamoto et al. | |
| 2004/0039919 | A1 * | 2/2004 | Takayama et al. | 713/180 |
| 2004/0204120 | A1 * | 10/2004 | Jiles | 455/564 |
| 2004/0235524 | A1 * | 11/2004 | Abuhamdeh | 455/558 |
| 2006/0064600 | A1 * | 3/2006 | Polichetti et al. | 713/183 |
| 2006/0165060 | A1 * | 7/2006 | Dua | 370/352 |
| 2006/0265243 | A1 * | 11/2006 | Racho et al. | 705/1 |
| 2008/0097844 | A1 * | 4/2008 | Hsu et al. | 705/14 |
| 2008/0162497 | A1 * | 7/2008 | Lim | 707/10 |
| 2008/0210754 | A1 * | 9/2008 | Lovett | 235/380 |
| 2009/0006254 | A1 * | 1/2009 | Mumm et al. | 705/44 |

* cited by examiner

*Primary Examiner* — Sonji Johnson

(57) ABSTRACT

Techniques for making electronic cards that can be displayed on a mobile phone. The techniques permit making an electronic card based on an arbitrary SMS message and making an electronic card (eCard) that corresponds to a pre-existing non-electronic privilege card such as a loyalty card. In the latter case, the system on which the card is being made obtains information about the user and the issuer and uses the information to determine whether to issue the eCard and also to make use validity information which is associated with the card and is used to determine the validity of the card as it is used.

24 Claims, 6 Drawing Sheets

US 8,746,581 B2

TECHNIQUES FOR PROVIDING AN ELECTRONIC REPRESENTATION OF A CARD

CROSS-REFERENCE TO RELATED APPLICATIONS

This patent application claims priority from U.S. provisional patent application 61/028,669, Slavin, et al., Techniques for providing an electronic representation of a card, filed Feb. 14, 2008, and is a continuation-in-part of U.S. Ser. No. 11/765,096, Slavin, et al., Using validity events to control the use of coupons containing barcodes in mobile devices that display the barcodes for reading by barcode readers, which has a 371(c) date of Jun. 19, 2007, and of U.S. Ser. No. 12/296,329, Customizing barcode images for particular displays, which is the U.S. National Stage of PCT/US2007/010270 and has a 371(c) date of Oct. 7, 2008. U.S. Ser. No. 11/765,096 has been published as U.S. published patent application 2007/0241189, and that published patent application is incorporated by reference herein for all purposes. PCT/US2007/010270 has been published as WO 2007/127385. Copies of both 2007/0241189 and WO 2007/127385 are attached as appendices to the present application and form part of its disclosure.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

Electronic cards, in particular electronic cards that correspond to already issued non-electronic cards which are issued by a card issuing party (the card issuer) to a party to which the card issuer is granting a privilege. Such cards will be termed in the following privilege cards. Common examples of privilege cards include coupons, loyalty cards, gift cards, identification cards, credit or debit cards, membership cards, tickets, and licenses.

2. Description of Related Art

Electronic privilege cards ("eCards") can provide significant convenience advantages to consumers over non-electronic privilege cards ("Cards") such as easy accessibility and being more environmentally friendly that their paper and plastic counterparts. These eCards, including any associated barcodes, can be stored in an electronic version of a wallet and can be displayed on a device such as a mobile telephone that has access to the wallet. When displayed, eCards can be used with barcode readers in the same fashion as their physical counterparts.

FIG. 1 shows a number of ways in which today's consumer can obtain a physical Card at 101: By applying for one via a web form (105), phone (103), or paper form (103). In all cases, the issuer collects information about the applicant and enters the information into a database (111, 109, 115). The consumer obtains a physical Card either immediately or via service such as US mail (107, 113, 115). Once the consumer has a physical copy of the card, he/she can then create an electronic version of the card (117). Currently available ways of doing this include:

Consumers fill out a form using an application running on a mobile device in which the consumer selects the type of Card from a pre-defined list and then enters the required information for that Card. The application can then present all of this information at a single time in tabular form, or place it on some type of background image to have it appear more like the original physical Card, Consumers fill out a form using a desktop application running on a personal computer in which the consumer selects the type of card from a pre-defined list and then enters the required information for that Card. The desktop application then transfers this information to an application running on the mobile device which then presents all of this information at a single time, or places it on some type of background image to have it appear more like the original physical Card.

Neither of these methods incorporates the use/display of a barcode as part of the eCard. The eCards made as described above are stored in an electronic wallet for easy access by the user. To use either the physical card or the eCard made from it, the user presents the card or the image of the eCard (119) to a representative of the issuer, who validates the card and provides the privilege represented by the card (121).

All kinds of eCard versions of privilege cards have a number of advantages over physical privilege cards:

A consumer can carry any number of eCards in a mobile phone

The eCards, if used as full replacements for non-electronic privilege cards, can reduce printing and delivery costs.

Privilege cards that are originally issued as eCards have a number of additional advantages over eCards made as indicated at 117 of FIG. 1:

Validation of a privilege card that is originally issued as an eCard can be automated and more kinds of validation are possible with eCards than with physical privilege cards. With eCards, validation checks can be performed when the eCard is issued and/or before/after they are to be displayed.

The latter checks can determine things such as whether the eCard has expired, whether a fixed number of uses has been exceeded, whether use of the card has resulted in further privileges, or whether the eCard is being used in the proper location.

eCards with automated validation can be used with clerkless point of sale systems.

Some of the issues with prior art solutions for obtaining an electronic form of a previously-existing privilege card include the lack of the validity checking that is available with an eCard, the lack of a way of ensuring that the eCard's barcode has the best form for the mobile device's display, and the lack of a way to obtain an eCard by simply using text messaging/SMS.

Further, obtaining an eCard as set forth in the discussion of FIG. 1 does not address four fundamental issues around the convenience of obtaining an electronic representation of a physical Card a consumer is already in possession of:

a way to easily communicate the method of requesting an eCard version of an already existing physical privilege, a method for a consumer to enter or send in an existing identification number (barcode or other identification number) from the internet or mobile device to an Electronic Card Issuing System and receiving back an electronic representation of that code on their mobile device, a way to shorten the number of digits that the consumer needs to type in order to enter their identification number, and a way for the consumer to identify the merchant/program that the identification number belongs to in order that appropriate logos or other identifying marks can be incorporated into the Card It is an object of the techniques disclosed in the following Detailed Description to provide users of mobile phones and other digital devices with displays and network connections with easy-to-use techniques for making eCards that correspond to already issued privilege cards, which permit the kinds of verification that are possible with eCards generally, and which are optimized for display on the devices for which they are intended.

BRIEF SUMMARY OF THE INVENTION

In one aspect, the object of the techniques is achieved by a method of making an electronic version of a previously-issued privilege card for a user. The previously-issued privilege card is issued by a card issuer and the method includes the steps performed in the processor of:
    receiving issue validation information for the electronic version from the user, the issue validation information including at least card identification information for the preexisting card;
    using the issue validation information and information of the card issuer to determine whether the electronic version should issue; and
    on validation, making the electronic version of the preexisting privilege card.

Further details of the above method are associating use validation information provided by the card issuer with the electronic version and using display information for a device upon which the electronic version is to be displayed to make the electronic version. In many cases, the electronic version includes a barcode and the display information is used to generate the barcode.

In another aspect, the invention is a method of making an electronic card for a mobile telephone. The telephone has a display and the ability to send text messages and the method includes the following steps. The steps are performed in a server to which the mobile telephone can send text messages:
    receiving a text message from the mobile telephone;
    making an electronic card based on the text message, the electronic card being displayable on the mobile telephone; and
    providing the electronic card to the mobile telephone.

Also included in this aspect are the steps performed in the mobile telephone of:
    sending a text message to a server, the server responding to the text message by making an electronic card that is based on the text and is displayable on the mobile telephone; and
    receiving the electronic card from the server.

Other objects and advantages will be apparent to those skilled in the arts to which the invention pertains upon perusal of the following Detailed Description and drawing, wherein:

Figure 1:
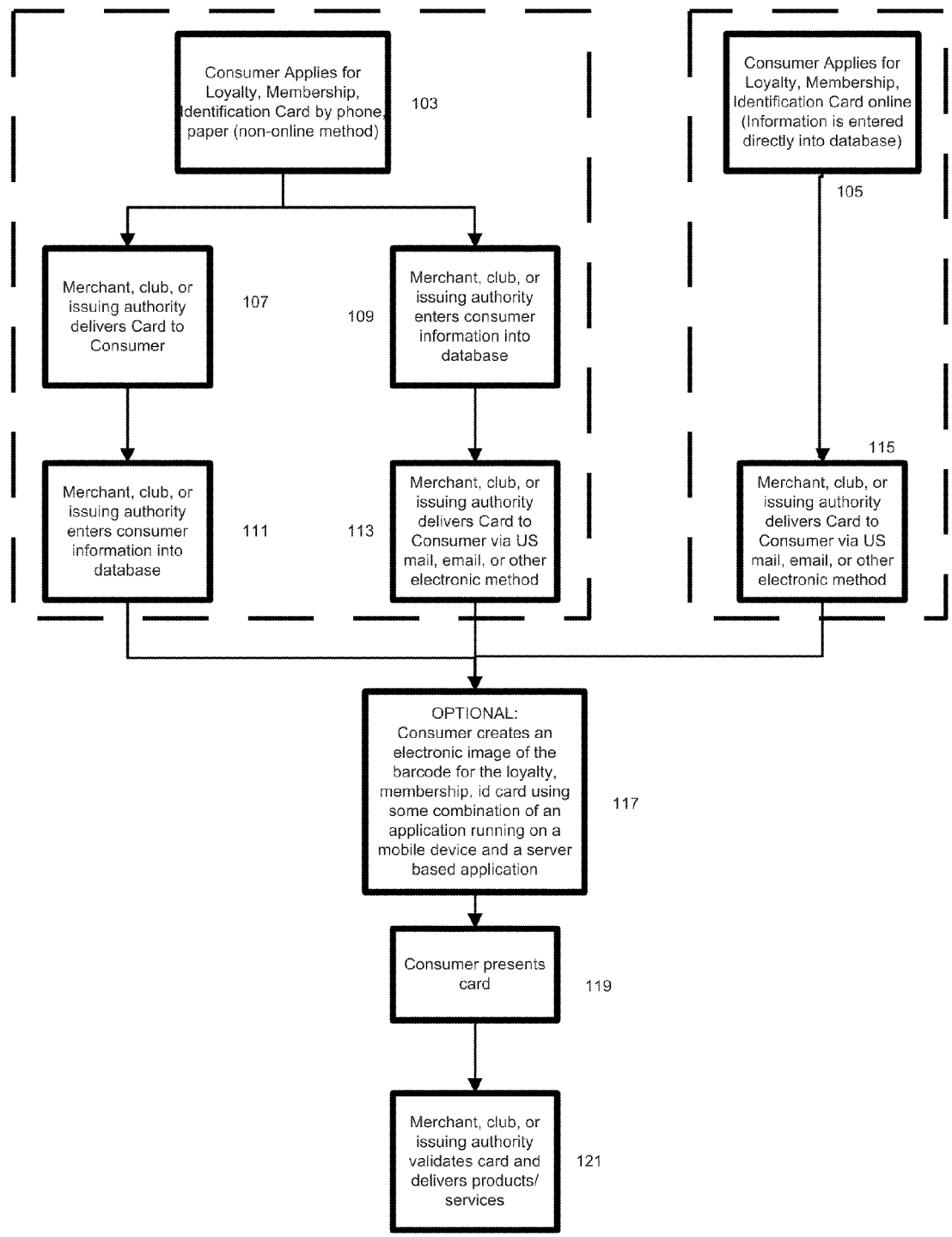
FIG. 1 Prior art techniques for providing consumers with non-electronic cards and then making e-cards corresponding to the non-electronic cards FIGS. 2A and 2B Techniques of the invention for making e-cards corresponding to non-electronic cards FIG. 3 First example of an electronic loyalty card made using the e inventive techniques.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

Overview of the Techniques

The following provides a general overview of the techniques and introduces terminology that is particularly relevant to the techniques. Included in the terminology are issue validation, the validation of an eCard prior to issue, and use validation, the continuing revalidation of the eCard after the card is issued to ensure that the card is valid when used. The basic process of issuing an eCard corresponding to an already-issued privilege card is for a user to enter information about the already-issued privilege Card such as merchant and identification number into a mobile device or web page. This information, termed issue validation information, is then transmitted to a server for validation (issue validation) and eCard generation. Before issuing the eCard, the server uses information obtained from the issuer of the non-electronic privilege card together with the information provided by the user to determine whether the eCard corresponds to a valid non-electronic Card. If so, the eCard may issue. Otherwise, it will not. The server may also obtain additional information from the user or the issuer of the non-electronic Card which is used to determine what kinds of validity checks will be made on the eCard when it is in use (use validation information). When the server issues the eCard, it may associate validity checking information derived from the use validation information with the eCard.

The issued eCard is then transmitted to a validity checking wallet which can perform the use validity checks. If the server has access to information about the display device the eCard is to be displayed upon, the server can also optimize the eCard for the display device. In particular, if the eCard includes a barcode, the server can optimize the barcode for the display device. Such device display information can be obtained by having the server look in the database of the carrier associated with the mobile device (if available) to determine the exact phone and model number associated with a mobile number. The server can then obtain information directly from a database of mobile device characteristics which is accessible by the server. If such information is not available from the mobile carrier, the server can return a message to the user asking the user to click on a web page.

When a mobile phone-based browser views a web page, it provides identification information about the mobile device which can then be used to look up display characteristics from a database of mobile device characteristics which is accessible by the server. Validity checking wallets and a number of use validity checks which can be performed by such wallets are disclosed in 2007/0241189; Techniques for optimizing barcodes for different display devices are disclosed in WO2007/127385.

Figure 2A:
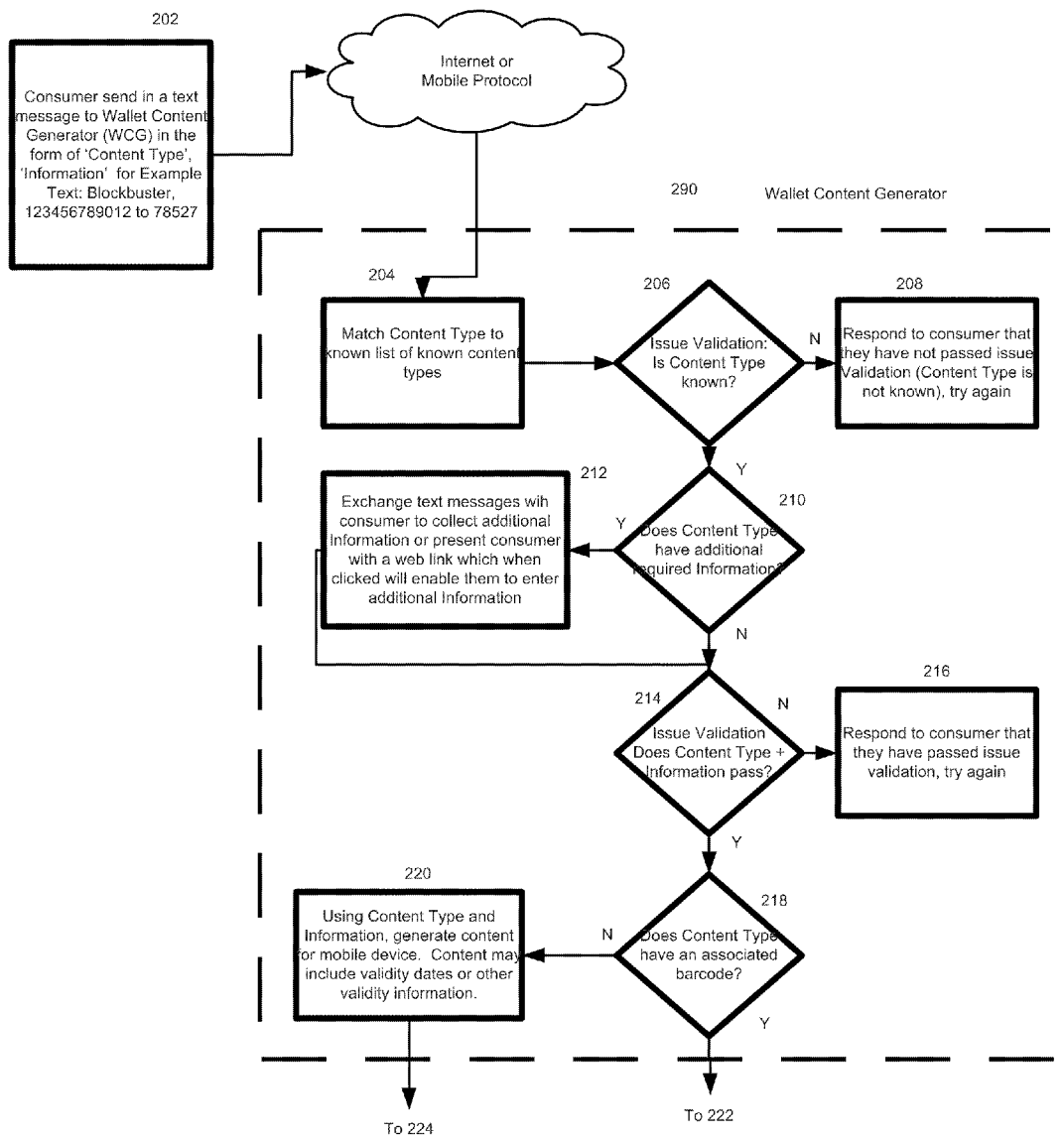
Figure 2B:
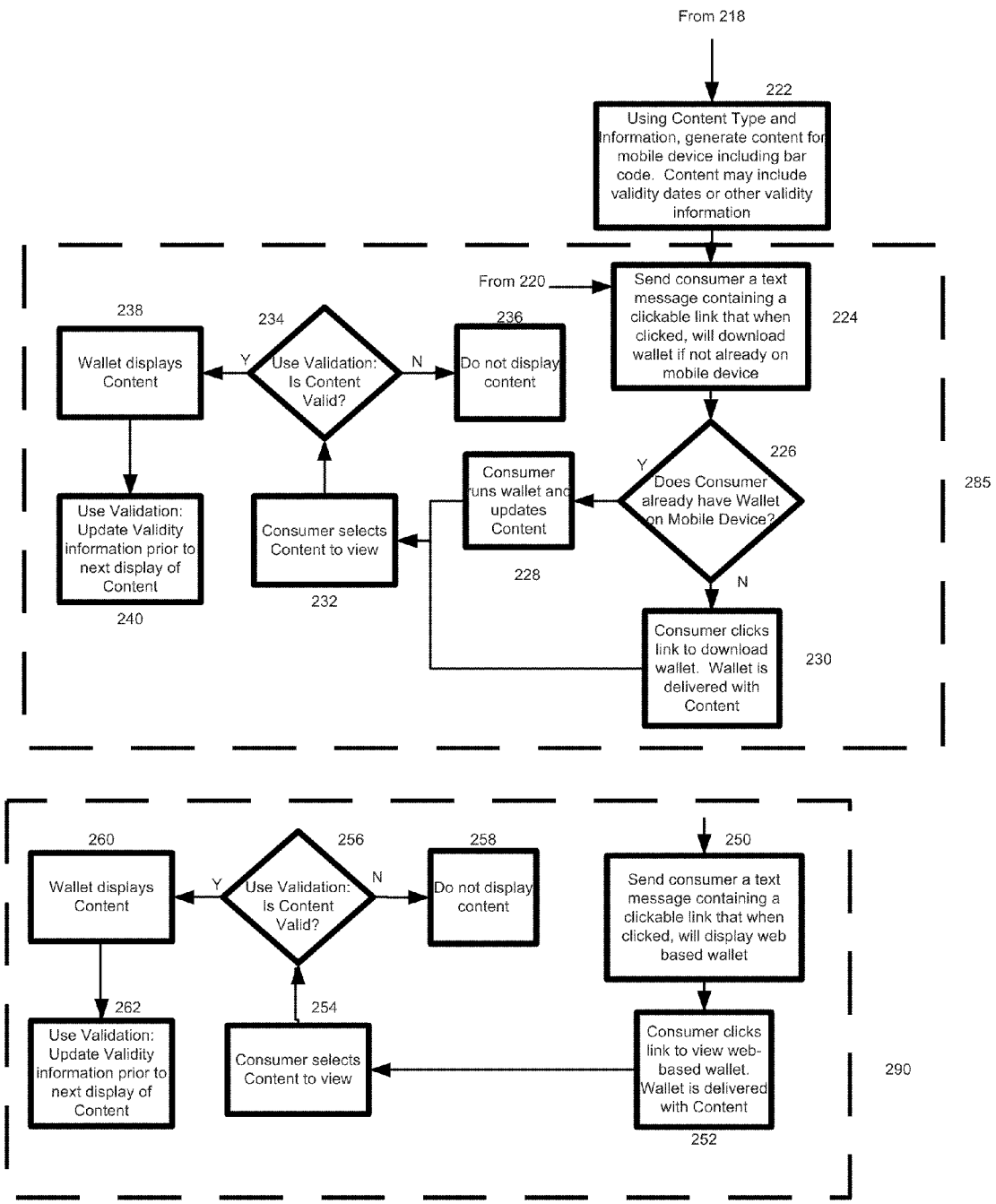

As shown in FIG. 2, in a presently-preferred embodiment, a user sends in a text message to a Wallet Content Generator (WCG) (290) in the form of 'Content Type', 'Information' for example, Text: Blockbuster 123456789012 to 78527 (202). In this case, the text indicates the issuer of the non-electronic privilege card and includes an identification number for the non-electronic privilege card. "78572" is an SMS shortcode which identifies WCG 290 in the mobile telephone network. Other identifications of WCG 290 may be used as well. The WCG then attempts to perform a first issue validation check by matching the content type to a list of known content types (204). Here, the content type is indicated by the issuer name "Blockbuster" and the form of the identification number. If the content type is not known, the WCG will respond to the User via text message that their message has failed validation and that they should try again (208).

If the Content Type is known, then the WCG will determine if additional content is required to make the eCard (210). Such additional content could be additional issue validation information. Examples could be the value of the identification number, information identifying the user of the eCard, information characterizing the user such as the user's age or group number, or detailed answers to identity-based questions such as credit limit, current balance information, or recent transaction. The additional content could also be use validation information such as the card expiration date, group number, additional codes present on the Card, or expiration date. Other additional content could be information required to display the eCard properly such as a digital photograph of the non-electronic Card. If so, the WCG will obtain the necessary content/information either from the user or will use information from the card issuer. The additional content/information from the user may be obtained via text messages or via a web page (212). At 214, additional validation checks may be made to ensure that all of the necessary information required for the Content Type has been collected and it is accurate. If all of the information required for the Content Type cannot be obtained, then inform the user (214,216). If information can be obtained, then determine if the Content Type has an associated barcode (214, 218). If there is no barcode, then using the Content Type and the collected information, generate content for the mobile device. If there is an associated barcode (222) then using Content Type and whatever additional information is needed to generate the barcode. Techniques for accurately generating such barcodes on varying types of mobile devices with pixel based displays in a fashion such that the barcode is readable by a barcode reader are described generally above and in detailed fashion in WO2007/127385. Following step 220 or 222, the process will continue with the steps under either 285 or 290.

If the content will reside in a validity checking wallet that resides on and runs on the mobile device, then step 224 in 285 sends the user a text message containing directions to either i) click a link contained in the message to download a wallet to store the content if the user is unsure that such wallet is not already on the mobile device, or ii) if the user believes the wallet is already on the mobile device, to remind the user to open the wallet application and update the content. If the user does not have the validity checking wallet already on their mobile device (226, 230), the user clicks the link to download the validity checking wallet and Content. If the user already has the validity checking wallet on their mobile device (226, 228), then the user runs the validity checking wallet application and updates the content.

Continuing on to Step 232, at some later point in time, the user displays the eCard. At this point, the validity checking wallet running on the mobile device determines whether the content is still valid. Techniques for doing this are described in 2007/0241189. If the content is not valid (234, 236), then do not display the eCard. If the content is valid, then proceed to step 238 and display the eCard on the mobile phone. If the eCard has a barcode and there is a barcode reader, the eCard may be displayed to the barcode reader; then proceed to step 240 and update validity information per the methods in 2007/0241189.

Alternatively, the wallet functionality can be delivered by a server based application which is accessible via a web browser running on the mobile device. In this case, starting with step 290, send the user a text message containing a clickable link that will display a web based validity checking wallet when clicked. When the user clicks the link in step 252, they are able to view the validity checking wallet. Continuing on to step 254, the user selects the content they wish to view.

If the content is not valid (256, 258), then do not display the content in the browser. If the content is valid, then proceed to step 260 and display the eCard in the browser. If the eCard has a barcode and a barcode reader is available, the eCard may be displayed to the barcode reader; then proceed to step 262 and update validity information per the methods in patent application 2007/0241189.

The following section describes two methods for using the techniques just described to make an eCard version of a preexisting non-electronic loyalty card.

Figure 3:
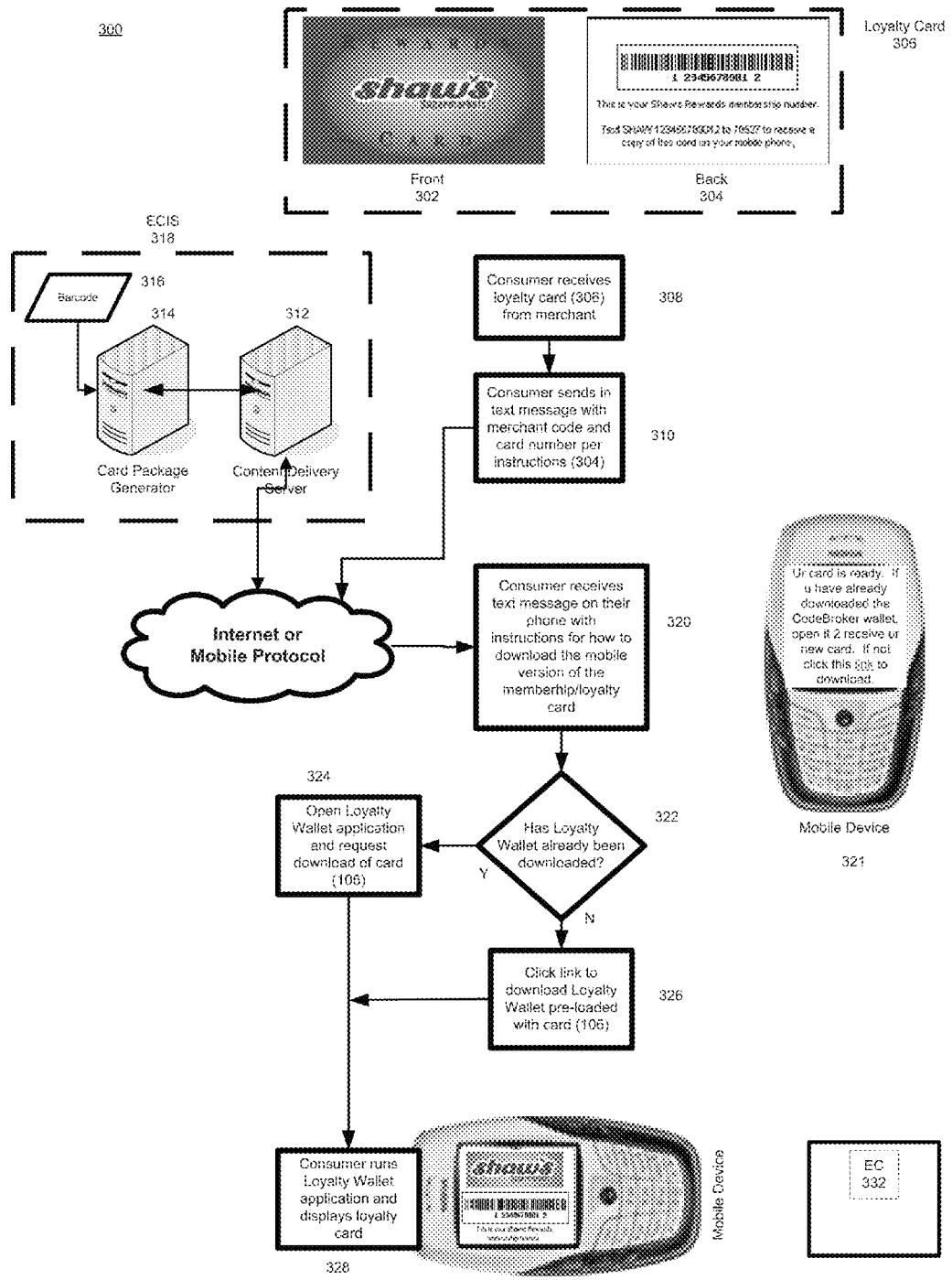

Method 1—Via Text Message FIG. 3

In this method, the back (or front) of each non-electronic loyalty Card 306 is imprinted with a message similar to the following: "Text % merchant code % % Card Number % to % shortcode % to receive a copy of this card on your mobile phone." In this example, % merchant code % is the name of the loyalty card's issuer or some shortened version of it and % Card Number % is the actual number on the non-electronic loyalty card. A specific example of this for a loyalty card is: "Text SHAW 123456789012 to 78527 to receive a copy of this card on your mobile device. (304)

After the user has received the non-electronic loyalty card 306 from the issuer (308), the user can make an eCard version of the loyalty card by texting in the message to the shortcode (310.) When the user texts in the message, the message goes to a server with an Electronic Card Issuing System (ECIS) (318). The ECIS receives the message, obtains the logo for the merchant, determines if the merchant's card has a barcode, optionally determines if there was any other information that needs to be i) obtained from the user via additional user interaction, ii) obtained from the card issuer, or iii) delivered with the card, optionally validates the card number, and then prepares an electronic package containing the eCard and/or an electronic validity checking wallet. The ECIS may also optionally obtain information about the mobile device in order to accurately render a barcode and/or other graphical information. The information may come from the user or may be obtained from information about the cell phone maintained in the cellular network or based upon interaction with the mobile device as described in this application and in WO2007/1273. At this point, a text message (SMS), email, or similar communication is sent from the ECIS (318) to the mobile device. The user then receives the text message or other communication containing instructions for how to download a validity checking wallet containing the eCard (or add the eCard to a validity checking wallet that was already on the mobile device) (320). One example of this is to send a Text message containing a link, as shown at 321. If the user already has a validity checking wallet on his/her phone, s/he opens the validity checking wallet application and request a download of the eCard (322, 324). If the user does not already have a copy of the validity checking wallet on the phone, the user clicks on a link to download the validity checking wallet pre-loaded with the eCard. (322, 326) At this point, the user runs the validity checking wallet application (330) containing eCard(s) (332) whenever they want to access/display their eCard(s). As an alternative method if the user does not already have a copy of the validity checking wallet on the phone, the user clicks on a link to download an empty validity checking wallet application, and then opens the validity checking wallet application and requests a download of the eCard.

Figure 4:
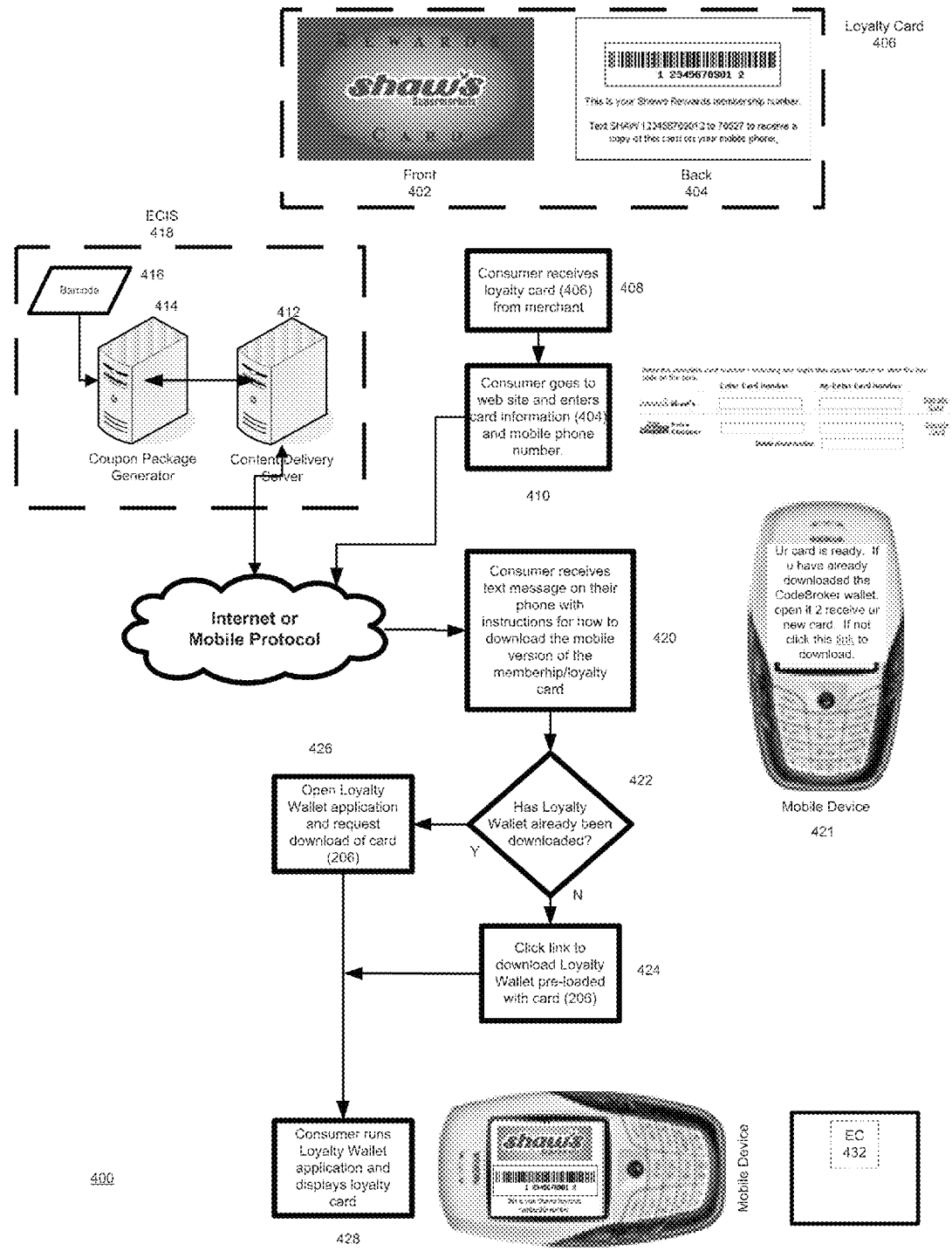
FIG. 4 Second example of an electronic loyalty card made using the inventive techniques.

Method 2—Via the Internet/Web—FIG. 4 In this method, the user has received a non-electronic loyalty card 406 from an issuer (408). To make a corresponding loyalty eCard, the user visits a web site (410) associated with the Electronic Card Issuing System (ECIS) (418), creates a user account, and then enters the merchant, the Card number, optional additional information, and an option to include a barcode (410). After entering this data, the user then enters their mobile phone number and requests that the eCard be transferred to their phone. At this point, the ECIS optionally determines if there is any other information needed to be delivered with the Card(s), optionally validates the Card(s) number, and then prepares an electronic package containing the eCard(s) and/or a validity checking wallet. The ECIS may also optionally request information about the mobile device (or look up this information) in order to accurately render a barcode and/or other graphical information. At this point, a text message (SMS), email, or similar communication is sent from the ECIS (418) to the mobile device. The user then receives the text message or other communication containing instructions for how the user can download a validity checking wallet containing the eCard (or add the eCard to a validity checking wallet that was already on the mobile device) (420). One example of this is to send a Text message containing a link, as shown at 421. If the user already has a validity checking wallet on his/her phone, s/he opens the validity checking wallet application and requests a download of the card (422, 424). If the user does not already have a copy of the validity checking wallet on the phone, s/he could click on a link to download the validity checking wallet pre-loaded with the eCard. (422, 426) At this point, the user runs the validity checking wallet application, as shown at 430 containing eCard(s) (432) whenever they want to access/display their eCard(s) (428).

As an alternative to Method 2, the user uses their mobile device containing a web browser to enter the Card data, and is then immediately presented with a link to download the eCard and/or validity checking wallet instead of receiving a message via text message, email, or other communication.

Figure 5:
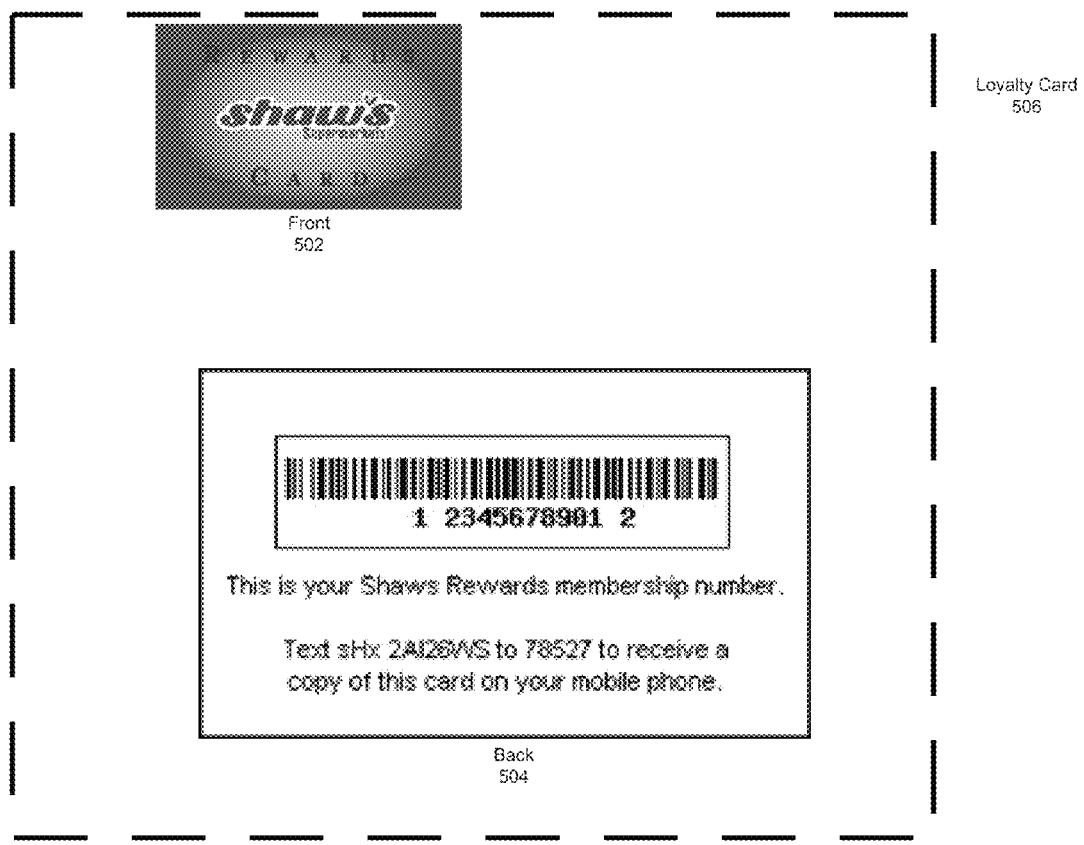
FIG. 5 A non-electronic loyalty card that is particularly adapted to being used to make an electronic loyalty card using the inventive techniques.

Optional method for texting in card number: Detailed in FIG. 5: As an alternative to Method 1 or 2 and to increase the convenience to the user and decrease the possibility of the user entering the wrong card number, the % merchant code % and/or card number % Card Number % that the user sends in is shortened by using an encoding scheme to a) reduce the total number of digits in the Card number and b) uniquely identify the club/loyalty/membership/payment program associated with the Card number. Then, a user texts in this shortened SuperCode (504) to receive a copy of the eCard to their mobile device.

Ex: Membership Card: BlockBuster Video; Membership Number: 1234 5678 9123 (12 digits). The Blockbuster membership card may have a SuperCode printed on the card that represents the above number in base 62 (using A-Z, a-z, 0-9 as digits). The SuperCode in this case is: 2A126WS. Note that this SuperCode is only 7 digits long.

Additional Delivery Methods

It is important to note that the ECIS could return eCards in a number of manners in addition to text message and to electronic validity checking wallet. These alternative methods include via Multimedia Messaging Service (MMS), or web page viewable on the user's mobile device.

Additional Methods for User to Request an eCard

An alternative method for a user to request an eCard would be for the user to initiate the Card request directly from the electronic validity checking wallet by entering the Card number and merchant identifier into the validity checking wallet, and then having the validity checking wallet either a) directly generate the eCard itself or b) send a request to the ECIS to generate a new eCard. In the case of a), the validity checking wallet would be performing both the issue validation as well as the use validation. Another alternative method is for the mobile device's camera to take a photograph of the Card, and through a combination of image recognition and barcode decoding done directly on the mobile device or on the server, identify the Merchant, the Card number, and possibly additional information from the card and turn this directly into an eCard. If this recognition and decoding is done on the server, then the server would transmit the card back to the mobile device via one of the methods already described herein.

Making eCards from Arbitrary Text Messages

While the techniques just described are particularly useful where the eCard is an electronic version of an already-issued privilege card and permit both issue validation and use validation of the eCard, a simplified version of the techniques can also be used to make any text message into an eCard. In this simplified version, the server responds to the text message by making an eCard that has the text message as its content and providing it to the cell phone. If the server has or can obtain information about the type of display used in the device from which the text message originated, the server can optimize the eCard for that type of display. It would of course also be possible to obtain information from the user which would permit use validation of the card.

CONCLUSION

The foregoing Detailed Description has disclosed to those skilled in the relevant technologies how to make and use eCards that are electronic versions of already-issued privilege cards and how to make and use eCards that are made from a text message and has further set forth the best mode presently known to the inventors of implementing their invention. It will, however, be immediately apparent to those skilled in the relevant technologies that many variations on the techniques disclosed herein are possible. The kind of communication between the device which is to receive the eCard and the server will depend on the kinds of devices involved, as will the kinds of optimizations for the bar codes.

The kinds of issue validity checking and use validity checking that are done will depend on the purpose of the privilege card and of the eCard that is based on the privilege card. It should be expressly noted here that the kinds of use validity checking employed with the eCard may be different from the kinds used with the non-electronic privilege card. Indeed, the kinds of use validity checking which are possible with the eCard may be a motive for the user to replace his or her non-electronic privilege card with an eCard and may also be a motive for the issuer of the privilege card to encourage such a replacement. As pointed out in the Detailed Description, the tasks necessary to produce the eCard may be distributed in different ways among the portable device, the server, and a user's PC.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. A method of making an electronic version of a previously-issued non-electronic version of a privilege card for a user having a device, the previously-issued non-electronic version of the privilege card having been issued with a card identifier by a card issuer and the method comprising the steps, performed in a processor remote from the user's device and not operated by the card issuer, of:
   receiving, from the user and not via the card issuer, issue validation information at the processor remote from the user's device for the electronic version including at least the card identifier for the previously-issued non-electronic version of the privilege card;
   using the issue validation information and additional information of the card issuer to determine whether the electronic version of the previously-issued non-electronic version of the privilege card should issue; and
   on validation, making the electronic version of the previously-issued non-electronic version of privilege card available through the user's device.

2. The method set forth in claim 1 further comprising the step of: associating use validation information provided by the card issuer with the electronic version of the previously-issued non-electronic version of the privilege card.

3. The method set forth in claim 1 further comprising the step of:
   using display information for the user's device upon which the electronic version of the previously-issued non-electronic version of the privilege card is to be displayed to make the electronic version of the previously-issued non-electronic version of the privilege card.

4. The method set forth in claim 3 wherein:
   the electronic version of the previously-issued non-electronic version of the privilege card includes a barcode; and
   in the step of using the display information, the display information is used to generate the barcode.

5. The method set forth in claim 1 wherein the electronic version includes an identifier for the user.

6. The method set forth in claim 5 wherein the identifier comprises alphanumeric text.

7. The method set forth in claim 5 wherein the identifier comprises a barcode.

8. The method set forth in claim 1 further comprising the step of:
   transmitting the electronic version of the previously-issued non-electronic version of the privilege card to the user's device.

9. A method of making an electronic version of a previously-issued non-electronic privilege card for a user having a mobile telephone, the mobile telephone having a display and being configured to send text messages and the method comprising the steps, performed in a server to which the mobile telephone sends Short Messaging Service (SMS) text messages, of:
   receiving a SMS text message from the mobile telephone, the message including a card identifier issued by the card issuer for the previously-issued non-electronic privilege card;
   making the electronic version of the previously-issued non-electronic privilege card based on the SMS text message, the electronic version of the previously-issued non-electronic privilege card being displayable on the mobile telephone; and
   providing the electronic version of the previously-issued non-electronic privilege card to the mobile telephone.

10. The method of claim 9 wherein the text message further comprises information of a card issuer for the previously-issued non-electronic privilege card.

11. The method of claim 10 wherein the information of the card issuer is a name for the card issuer, and wherein the card identifier includes an identification number issued by the card issuer for the previously-issued non-electronic privilege card.

12. The method of claim 9 wherein the previously-issued non-electronic privilege card is a privilege card.

13. A method of making an electronic privilege card from a previously-issued non-electronic privilege card for a user having a mobile telephone that has a display and being configured to send Short Messaging Service (SMS) text messages, the method comprising the steps, performed in the mobile telephone, of:
   sending a SMS text message to a server, the SMS text message including a card identifier issued by a card issuer for the previously-issued non-electronic privilege card, the server responding to the text message by making an electronic privilege card from the previously-issued non-electronic privilege card that is based on the text message and is displayable on the mobile telephone; and
   receiving the electronic privilege card of the previously-issued non-electronic privilege card from the server.

14. The method of claim 13 wherein the card identifier includes information of the card issuer.

15. The method of claim 13 wherein the card identifier is associated by the card issuer with a user of the previously-issued non-electronic privilege card.

16. A method of utilizing an electronic version of a previously-issued non-electronic privilege card for a user having a device, the previously-issued non-electronic privilege card having been issued with a card identifier by a card issuer, the method comprising the steps performed in a server of:
   receiving, from the user and not via the card issuer, issue validation information for the electronic version including at least the card identifier for the previously-issued non-electronic privilege card;
   using the issue validation information to determine whether the electronic version of the previously-issued non-electronic privilege card should issue;
   on validation, creating the electronic version of the previously-issued non-electronic privilege card;
   transmitting the electronic version to the user's device upon which the electronic version is to be displayed; and
   displaying the electronic version of the previously-issued non-electronic privilege card on the user's device, wherein the server is remote from the device upon which the electronic version is to be displayed and is not operated by the card issuer.

17. The method set forth in claim 16 further comprising the step of:
   associating use validation information provided by the card issuer with the electronic version of the previously-issued non-electronic privilege card.

18. The method set forth in claim 16 further comprising the step of:
   using display information for the user's device upon which the electronic version of the previously-issued non-electronic privilege card is to be displayed to make the electronic version of the previously-issued non-electronic privilege card.

19. The method set forth in claim 18 wherein:
   the electronic version of the previously-issued non-electronic privilege card includes a barcode; and in the step of using the display information, the display information is used to generate the barcode.

20. A method of making electronic versions of previously-issued non-electronic privilege cards for users having devices, each of the previously-issued non-electronic privilege cards having been issued with a card identifier by a plurality of card issuers, and the method comprising the steps, performed in a server computer remote from the users' devices and not operated by the card issuers, of:

receiving, from the users and not via the card issuers, issue validation information for the electronic versions, at the server computer remote from the user's devices, the issue validation information including at least the card identifiers for the previously-issued non-electronic privilege cards;

for each privilege card, using the issue validation information and additional information of the card issuer to determine whether the electronic version of the previously-issued non-electronic privilege card should issue;

for each privilege card, on validation, making the electronic version of the previously-issued non-electronic privilege card available through the user's device.

21. The method of claim 20, further comprising:

displaying the electronic version of the previously-issued non-electronic privilege card from the user's device.

22. The method set forth in claim 20 further comprising the step of:

associating use validation information provided by the card issuer with the electronic version of the previously-issued non-electronic version of the privilege card.

23. The method set forth in claim 20 further comprising the step of:

using display information for the user's device upon which the electronic version of the previously-issued non-electronic privilege card is to be displayed to make the electronic version of the previously-issued non-electronic privilege card.

24. The method set forth in claim 23 wherein:

the electronic version of the previously-issued non-electronic privilege card includes a barcode; and in the step of using the display information, the display information is used to generate the barcode.

* * * * *